US 12,172,657 B2

(12) United States Patent
Zeng et al.

(10) Patent No.: US 12,172,657 B2
(45) Date of Patent: Dec. 24, 2024

(54) MACHINE LEARNING-BASED PREDICTIVE DYNAMICS FOR VEHICLE MOTION CONTROL

(71) Applicant: GM Global Technology Operations LLC, Detroit, MI (US)

(72) Inventors: Shuqing Zeng, Sterling Heights, MI (US); Yubiao Zhang, Sterling Heights, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 221 days.

(21) Appl. No.: 18/049,809

(22) Filed: Oct. 26, 2022

(65) Prior Publication Data

US 2024/0140445 A1 May 2, 2024

(51) Int. Cl.
*B60W 50/00* (2006.01)
*B60W 60/00* (2020.01)
*G05B 13/02* (2006.01)
*G06N 3/044* (2023.01)

(52) U.S. Cl.
CPC ...... *B60W 50/0097* (2013.01); *B60W 60/001* (2020.02); *G05B 13/027* (2013.01); *G06N 3/044* (2023.01); *B60W 2552/40* (2020.02)

(58) Field of Classification Search
CPC ........... B60W 50/0097; B60W 60/001; B60W 2552/40; B60W 50/00; B60W 2050/0005; G05B 13/027; G06N 3/044; G06N 3/045; G06N 3/08; G06N 3/084; H04W 4/44; H04W 4/46
See application file for complete search history.

(56) References Cited

U.S. PATENT DOCUMENTS

| 11,628,826 B2 | 4/2023 | Flumeri et al. |
| 2008/0133066 A1* | 6/2008 | Takenaka ............... B62D 6/003 701/1 |
| 2021/0049445 A1 | 2/2021 | Bielby et al. |
| 2021/0188284 A1* | 6/2021 | Hassel .................. B60W 10/20 |
| 2021/0197625 A1 | 7/2021 | Laperle et al. |

(Continued)

FOREIGN PATENT DOCUMENTS

| CN | 110244734 A | 9/2019 |
| CN | 111222666 A | 6/2020 |
| CN | 113386781 A | 9/2021 |

OTHER PUBLICATIONS

Brown et al. "Safe Driving Envelopes for Path Tracking in Autonomous Vehicles," Control Engineering Practice, vol. 61, Apr. 2016, pp. 307-316.

(Continued)

*Primary Examiner* — Behrang Badii
(74) *Attorney, Agent, or Firm* — Vivacqua Crane, PLLC

(57) ABSTRACT

A method includes receiving sensed vehicle-state data, actuation-command data, and surface-coefficient data from a plurality of remote vehicles, inputting the sensed vehicle-state data, the actuation-command data, and the surface-coefficient data into a self-supervised recurrent neural network (RNN) to predict vehicle states of a host vehicle in a plurality of driving scenarios, and commanding the host vehicle to move autonomously according to a trajectory determined using the vehicle states predicted using the self-supervised RNN.

20 Claims, 11 Drawing Sheets

(56) References Cited

U.S. PATENT DOCUMENTS

2022/0234618 A1    7/2022    Kabzan et al.
2023/0331236 A1*  10/2023  Yoon .................. B60W 40/068

OTHER PUBLICATIONS

Alzubaidi L, et al. Review of deep learning: concepts, CNN architectures, challenges, applications, future directions. J Big Data. 2021;8(1):53. doi: 10.1186/s40537-021-00444-8. Epub Mar. 31, 2021. PMID: 3381 (Year: 2021).

B. Mersch, et al., "Maneuver-based Trajectory Prediction for Self-driving Cars Using Spatio-temporal Convolutional Networks," 2021 I EEE/RSJ International Conference on Intelligent Robots and Systems (I Ros), Prague, Czech Republic, 2021, pp. 4888-4895, doi: 10.11 (Year: 2021).

J. Chen, C. Zhang, J. Luo, J. Xie and Y. Wan, "Driving Maneuvers Prediction Based Autonomous Driving Control by Deep Monte Carlo Tree Search," in IEEE Transactions on Vehicular Technology, vol. 69, No. 7, pp. 7146-7158, Jul. 2020, doi: 10.1109/TVT .2020. 2991584. (Year: 2020).

N. Ye et al., "Bayes FT: Bayesian Optimization for Fault Tolerant Neural Network Architecture," 2021 58th ACM/IEEE Design Automation Conference (DAC), San Francisco, CA, USA, 2021, pp. 487-492, doi: 10.1109/ DAC18074.2021.9586115. (Year: 2021).

Srivastava, Nitish, et al. "Dropout: a simple way to prevent neural networks from overfitting." The journal of machine learning research 15.1 (2014): 1929-1958. (Year: 2014).

Teti, Michael, et al. "A systematic comparison of deep learning architectures in an autonomous vehicle." arXiv preprint arXiv: 1803.09386 (2018). (Year: 2018).

\* cited by examiner

MACHINE LEARNING-BASED PREDICTIVE DYNAMICS FOR VEHICLE MOTION CONTROL

INTRODUCTION

The present disclosure relates to systems and methods for vehicle motion control. More particularly, the present disclosure describes machine learning-based predictive systems and methods for vehicle motion control.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Currently, some autonomous vehicles use model predictive control (MPC) methods to determine the future trajectory. However, it is labor intensive to tune and calibrate MPC parameters. Further, new vehicle actuators (e.g., differential drive, rear wheel steering, 4-Wheel Independent Steering) have been developed, which complicates the determination of MPC parameters. It is also challenging to tackle unknown road surface coefficients using MPC control methods. Also, when using MPC methods, the autonomous vehicle may not take into account significant behavior changes to the tires changes (e.g., tire wear). It is therefore desirable to develop machine learning-based predictive systems and methods for vehicle motion control that overcomes the aforementioned shortcomings.

SUMMARY

The present disclosure describes a method for vehicle motion control. In an aspect of the present disclosure, the method includes receiving sensed vehicle-state data, actuation-command data, and surface-coefficient data from a plurality of remote vehicles, inputting the sensed vehicle-state data, the actuation-command data, and the surface-coefficient data into a self-supervised recurrent neural network (RNN) to predict vehicle states of a host vehicle in a plurality of driving scenarios, and commanding the host vehicle to move autonomously according to a trajectory determined using the vehicle states predicted using the self-supervised RNN. The method described in this paragraph improves autonomous vehicle technology by establishing a genetic non-parametric scheme applicable to any vehicle model, developing a new paradigm in chassis control enabled by an artificial intelligence agent framework, establishing an end-to-end self-supervisory learning scheme without manual annotation, enabling an automatic massive data-driven method (from a vehicle fleet) that converges at an optimal control policy, and enabling self-adaptation in handling low coefficients of friction, tire wearing, uneven weight distribution, among others.

In an aspect of the present disclosure, the method further includes training the self-supervised RNN. Training the self-supervised RNN includes receiving training data sets. The training data sets include the sensed vehicle-state data and the actuation-command data. The sensed vehicle-state data is buffered.

In an aspect of the present disclosure, the self-supervised RNN uses stochastic gradient descent learning to predict the vehicle states of the host vehicle in the plurality of driving scenarios.

In an aspect of the present disclosure, the self-supervised RNN includes a plurality of blocks linked sequentially with a bypass connection. The self-supervised RNN further includes a recurrent layer. The recurrent layer is the last layer of the self-supervised RNN.

In an aspect of the present disclosure, each of the plurality of blocks includes a batch normalization layer and a fully connected layer following the batch normalization layer.

In an aspect of the present disclosure, the fully connected layer includes a Leaky rectified linear unit (ReLU) activation function.

In an aspect of the present disclosure, each of the plurality of blocks includes a dropout layer following the fully connected layers.

In an aspect of the present disclosure, training the self-supervised RNN includes initializing the self-supervised RNN with a plurality of random weights. Each of the plurality of the random weights has a weight value. The weight value is less than a predetermined value.

In an aspect of the present disclosure, training the self-supervised RNN includes minimizing a prediction error.

In an aspect of the present disclosure, the prediction error is calculated using the following equation:

$$e = \sum_{k=t-T+1}^{t} \gamma^{k-t+T-1} \|s(k) - \tilde{s}(k)\|$$

where:
e is the prediction error;
$\gamma$ is a discounting factor, wherein $0<\gamma<1$;
$\|\cdot\|$ is Huber loss for handling outliers;
k is an index of summation;
t is an upper limit of the summation;
T is a predetermined number;
s(k) is a vehicle state of the host vehicle; and
$\tilde{s}(k)$ is a predicted vehicle state of the host vehicle.

The present disclosure also describes a tangible, non-transitory, machine-readable medium, including machine-readable instructions, that when executed by one or more processors, cause one or more processors to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
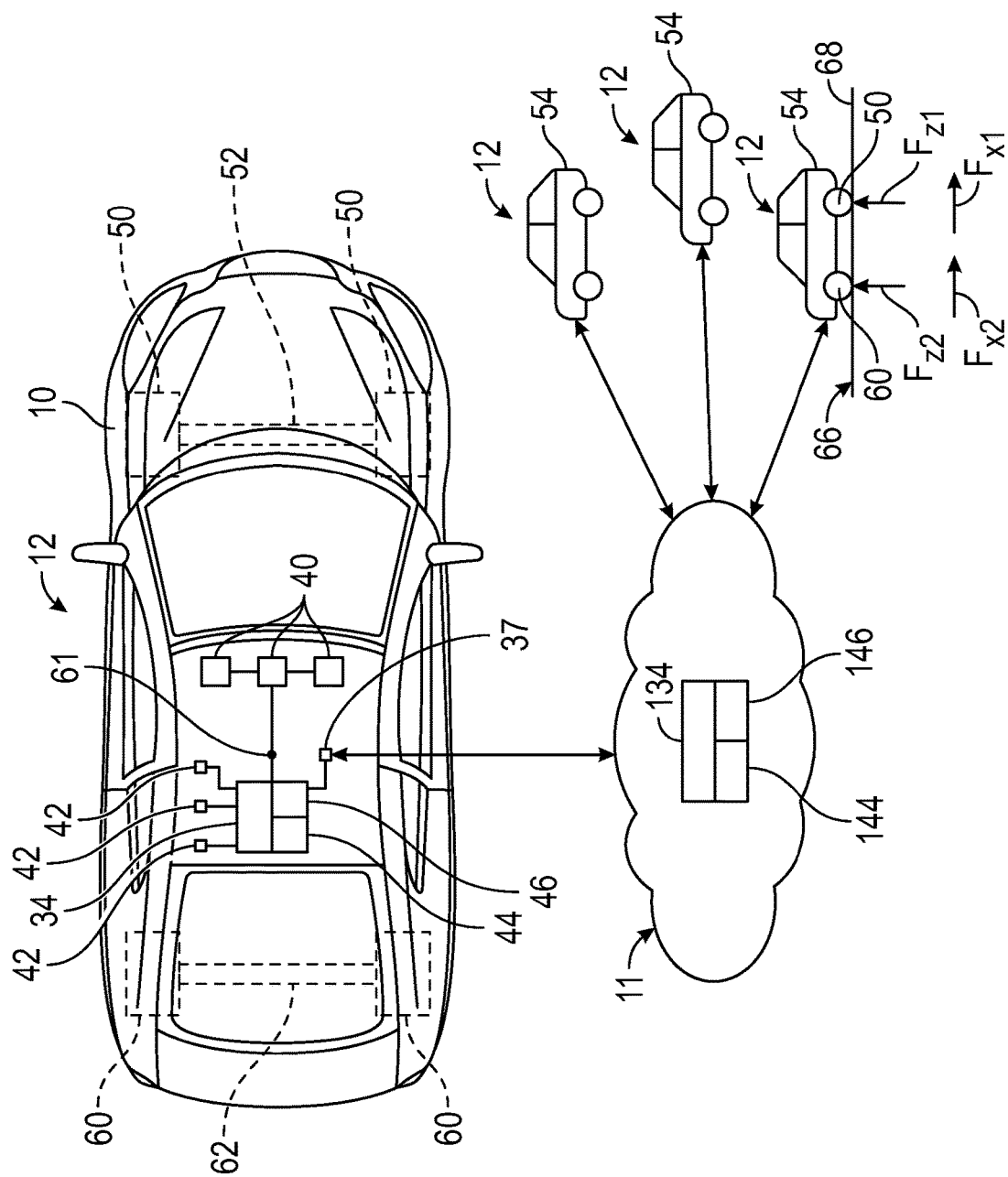
FIG. 1 is a schematic diagram of a host vehicle, a plurality of remote vehicles, and a system for predicting vehicle dynamics using machine learning in communication with the host vehicle and the plurality of remote vehicles.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 is in communication with a vehicle motion control system 11. While the system 11 is shown outside of the host vehicle 10, it is contemplated that some or all of the system 11 may be part of the host vehicle 10. As a non-limiting example, the system 11 may be a cloud-based system in wireless communication with the host vehicle 10. Although the host vehicle 10 is shown as a sedan, it is envisioned that that host vehicle 10 may be another type of vehicle, such as a pickup truck, a coupe, a sport utility vehicle (SUVs), a recreational vehicle (RVs), etc. Irrespective of the type of vehicle 12, the host vehicle 10 may be an autonomous vehicle configured to drive autonomously.

The vehicle 10 includes a vehicle controller 34 and one or more sensors 40 in communication with the vehicle controller 34. The sensors 40 collect information and generate sensor data indicative of the collected information. As non-limiting examples, the sensors 40 may include Global Navigation Satellite System (GNSS) transceivers or receivers, yaw rate sensors, speed sensors, lidars, radars, ultrasonic sensors, and cameras, among others. The GNSS transceivers or receivers are configured to detect the location of the host vehicle 10 in the globe. The speed sensors are configured to detect the speed of the host vehicle 10. The yaw rate sensors are configured to determine the heading of the host vehicle 10. The cameras may have a field of view large enough to capture images in front, in the rear, and in the sides of the host vehicle 10. The ultrasonic sensor may detect dynamic objects, such as remote vehicles 54. The remote vehicles 54 may include one or more sensors 40 as described above with respect to the host vehicle 10.

The vehicle controller 34 includes at least one vehicle processor 44 and a vehicle non-transitory computer readable storage device or media 46. The vehicle processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 of the vehicle controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the host vehicle 10. The vehicle non-transitory computer readable storage device or media 46 may store map data and/or sensor data received from one of the sensors 40. The sensor data may include localization data received from the GNSS transceiver. The map data includes a navigation map. The remote vehicles 54 may include one or more vehicle controllers 34 as described above with respect to the host vehicle 10.

The host vehicle 10 may include one or more communication transceivers 37 in communication with the vehicle controller 34. Each of the communication transceivers 37 is configured to wirelessly communicate information to and from other remote entities, such as the remote vehicles 54, (through "V2V" communication), infrastructure (through "V2I" communication), remote systems at a remote call center (e.g., ON-STAR by GENERAL MOTORS, and/or personal electronic devices, such as a smart phone. The communication transceivers 37 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication transceivers 37 may include one or more antennas for receiving and/or transmitting signals, such as cooperative sensing messages (CSMs). The communication transceivers 37 may be considered sensors 40 and/or sources of data. The remote vehicles 54 may include one or more communication transceivers 37 as described above with respect to the host vehicle 10.

The host vehicle 10 includes one or more actuators 42 in communication with the vehicle controller 34. The actuators 42 control one or more vehicle features such as, but not limited to, a propulsion system, a transmission system, a steering system, and a brake system. The vehicle features may further include interior and/or exterior vehicle features such as, but are not limited to, doors, a trunk, and cabin features such as air, music, lighting, etc. The remote vehicles 54 may also include actuators 42 as described in FIG. 1 with respect to the host vehicle 10.

The host vehicle 10 may also include one or more front tires 50 and a front axle 52 coupled between the front tires 50. Further, the host vehicle 10 may include one or more rear tires 60 and a rear axle 62 coupled between the rear tires 60. The remote vehicles 54 may also include front tires 50, rear tires 60, a front axle 52, and a rear axle 62.

The system 11 includes one or more system controller 134. The system controller 134 includes at least one system processor 144 and a system non-transitory computer readable storage device or media 146. The system processor 144 may be a custom made or commercially available processor, a central processing unit (CPU), a graphics processing unit (GPU), an auxiliary processor among several processors associated with the system controller 134, a semiconductor-based microprocessor (in the form of a microchip or chip set), a macroprocessor, a combination thereof, or generally a device for executing instructions. The system computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the system processor 144 is powered down. The system computer-readable storage device or media of the system controller 134 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions. The system non-transitory computer readable storage device or media 146 may store map data and/or sensor data received from one of the sensors 40. The sensor data may include localization data received from the GNSS transceiver. The map data includes a navigation map.

The instructions may include one or more separate programs, each of which comprises an ordered listing of executable instructions for implementing logical functions. The instructions, when executed by the vehicle processor 44 and/or the system processor 144, receive and process signals from the sensors 40, perform logic, calculations, methods and/or algorithms for automatically controlling the components of the host vehicle 10, and generate control signals to the actuators to automatically control the components of the host vehicle 10 based on the logic, calculations, methods, and/or algorithms. Although a single system controller 134 is shown in FIG. 1, the system 11 may include a plurality of system controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the system controller 134 are embodied in the system 11. The system non-transitory computer readable storage device or media 146 and/or the vehicle non-transitory computer readable storage device or media 46 includes machine-readable instructions that when executed by the one or more system processors 144 and/or vehicle processors 44, cause the system processors 144 and/or the vehicle processors 44 to execute the methods and processed described below.

Figure 2:
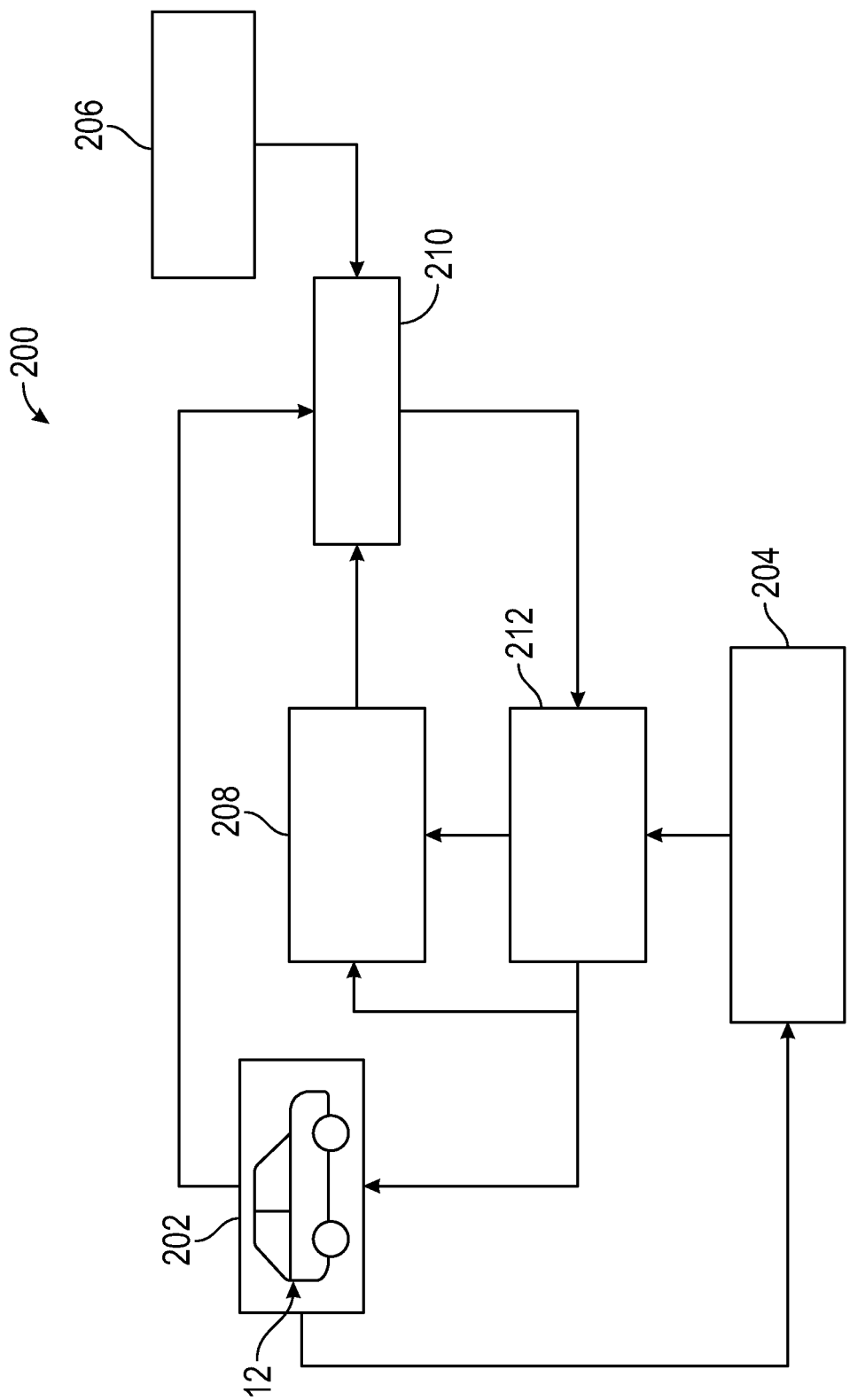
FIG. 2 is a flowchart of a method for vehicle motion control.

FIG. 2 is a flowchart of a method 200 for controlling the motion of the host vehicle 10. The method 200 begins at block 202. At block 202, one or more vehicles 12, such as the host vehicle 10 and the remote vehicles 54, collect data (i.e., sensor data) using the sensors 40. Therefore, block 202 entails a data mining operation from a vehicle fleet (e.g., the remote vehicles 54). Replay buffer data is used for offline training. As discussed above, the sensors 40 may be radars, cameras, lidars, speedometers, yaw rate sensors, and/or GNSS transceivers among others. Also, at block 202, the vehicle controllers 34 of each vehicle 12, such as the host vehicle 10 and the remote vehicles 54, determine the vehicle state using the sensor data from the sensors 40 (i.e., the sensed vehicle state of the plurality of vehicles 12). In the present disclosure, the term "vehicle state" means the velocity, position, heading, and acceleration of the vehicle 12 (e.g., the host vehicle 10 and/or remote vehicles 54). The term "sensed vehicle-state data" means the information about the vehicle state of a vehicle sensed by the sensors 40. The sensed vehicle-state data (i.e., the data collected from the fleet of remote vehicles 54) is aggregated to build a dataset with complete excitation. The data aggregation may be agnostic. That is, the aggregated data is normalized to unify that from different chassis categories (e.g., compact passenger cars, heavy duty truck, etc.). The data aggregation may be dependent on the vehicle chassis (e.g., small passenger vehicle dataset, heavy duty truck data set, etc.). The data aggregation may be vehicle model dependent. Further, data aggregation may be vehicle usage dependent (e.g., mileage, model year, etc.). The sensed vehicle state of each vehicle 12 (i.e., the sensed vehicle-state data) is then sent to the system controller 134, which may be part of a remote server. Then, the method 200 continues to block 204.

At block 204, the system controller 134 receives the vehicle state of each vehicle 12 (e.g., the host vehicle 10 and remote vehicles 54). Further, at block 204, the system controller 134 determines (e.g., estimates) the road surface condition using, among other things, the sensor data from multiple remote vehicles 54 for each driving scenario. For example, the system controller 134 may use images captured by cameras to determine the road surface condition. In the present disclosure, the term "road surface condition" means a condition of the surface 66 of the road 68 (FIG. 1) where the vehicle 12 (e.g., the host vehicle 10 and/or remote vehicles 54) is located (e.g., moving or stationary). As a non-limiting example, the road surface condition may include the coefficient of friction between the tires of the vehicle 12 (e.g., the host vehicle 10 and/or remote vehicles 54) and the surface of the road 68 where the vehicle is driving. The system controller 134 may also associate the sensed vehicle state with the road surface condition for each driving scenario.

The method 200 also includes block 206. At block 206, the system controller 134 may retrieve a reference vehicle states from the system non-transitory computer readable storage device or media 146. The reference vehicle states may be predetermined by testing the host vehicle 10.

The method 100 also includes block 208. At block 208, the system controller 134 executes a forward dynamics process to learn the forward vehicle dynamics of a vehicle 12 (e.g., the host vehicle 10 or another vehicle such as the remote vehicles 54) in different driving scenarios using sensed the vehicle-state data, the actuation-command data, and the surface-coefficient data from multiple remote vehicles 54. The term "forward vehicle dynamics" means the magnitude and direction of the normal forces $F_{x1}$ and $F_{x2}$ under the front tires 50 and the rear tires 60, respectively, as well as the traction forces $F_{x1}$ and $F_{x2}$ of the front tires 50 and the rear tires 60, respectively, while the vehicle 12 (e.g., the host vehicle 10 or another vehicle such as the remote vehicles 54) moves forward. At block 208, the system controller 134 may execute a recurrent neural network (RNN) to predict the forward dynamics and vehicle states of the host vehicle 10 in a plurality of driving scenarios (i.e., the predicted vehicle states). The forward dynamics process at block 208 is a genetic non-parametric scheme applicable to any vehicle model and is a new paradigm in chassis control enabled by an artificial intelligence (AI) agent framework. The forward dynamics process is an end-to-end self-supervisory learning scheme without manual annotation and uses massive data captured from a vehicle fleet (e.g., the remote vehicles 54). The forward dynamics process is a neural network that converges at an optimal control policy and can self-adapt to handle low coefficient of friction, tire wearing, uneven weight distribution, etc. The neural network weights may be tuned to adapt to environment changes (e.g., tire wear, replaced tire, weight distribution, etc.). This neural network may be partitioned into a backbone and a head. The adaptation occurs only in the head. The backbone weight is frozen during adaptation. The head weight is adjusted using the stochastic gradient descending method. The forward dynamics process may be implemented in the vehicle controller 34 and/or the system controller 134 without the costly manual data labeling. After block 208, the method 200 continues to block 210.

At block 210, the system controller 134 concatenates the predicted vehicle states and the reference vehicle states to obtain the concatenated vehicle states. Then, the method 100 proceeds to block 212.

At block 212, the system controller 134 executes an inverse dynamics process to establish a control policy for the host vehicle 10 or any other vehicle. The inverse dynamics process receives as an input the concatenated vehicle states (which is an output of block 210) and the road surface condition determined at block 204. Further, inverse dynamics process is implemented as a neural network and outputs a plurality of actuator commands for each driving scenario. The output of the neural network also includes a trajectory for each driving scenario. This output is sent to the vehicle controller 34. The vehicle controller 34 then commands the host vehicle 10 to move autonomously in accordance with a trajectory determined using the method 200. The term "actuator command" means a command given to the host vehicle 10 (or another vehicle 12) to control one or more actuators 42. As discussed above, the actuator 42 may include a steering system, a propulsion system, a brake system, among others. The actuator commands are then sent to the host vehicle 10 (or another vehicle 12) to control the movements of the host vehicle 10 (or another vehicle 12). In response, the actuators 42 actuate in accordance with the actuator commands to control the movements of the host vehicle 10. The actuator commands determined at block 212 also served as inputs for the forward dynamics process at block 208. The actuator commands may be configured as actuation-command data. In the present disclosure, the term "actuation-command data" means information about the actuator command provided to the host vehicle 10 (or another vehicle 12) to control one or more actuators 42. As discussed above, the neural network of block 212 may be partitioned into a backbone and a head and the weights may be tuned to adapt to environment changes (e.g., tire wear, replaced tire, weight distribution, etc.). The adaptation may occur only in the head. The backbone weights may be frozen during adaptation. The actuation-command data may be collected from remote vehicles 54 and is associated with the sensed vehicle states during different driving scenarios.

Figure 3:
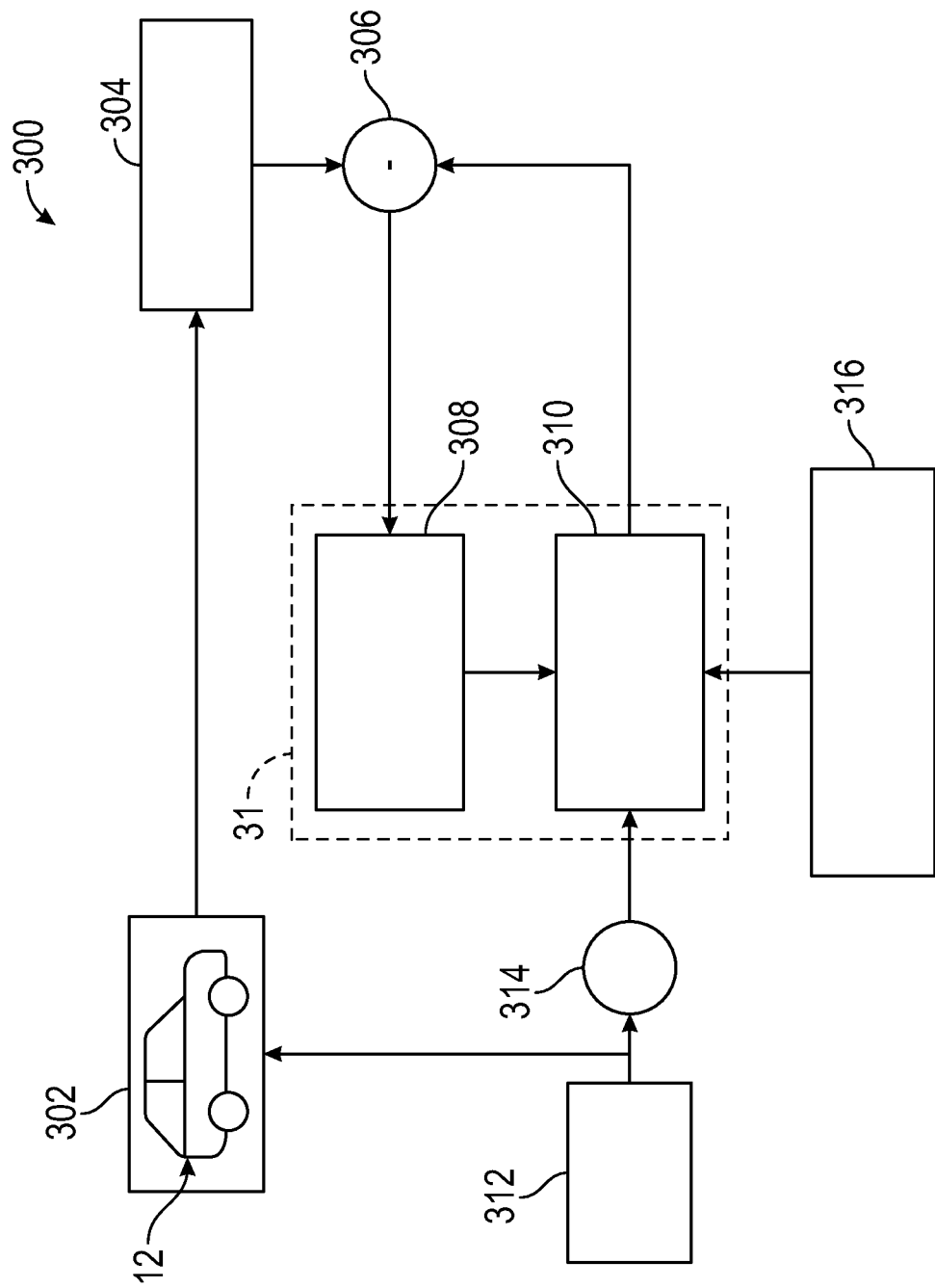
FIG. 3 is a flowchart of a process for predicting vehicle states.

FIG. 3 is a flowchart of an example of a forward dynamics process 300. The process 300 is a self-taught supervised learning method with no manual annotation and may be used at block 208 (FIG. 2) to learn the forward dynamics of the host vehicle 10 (or any other vehicle 12). The process 300 begins at block 302. At block 302, the system controller 134 receives sensed vehicle states from multiple remote vehicles 54 in different driving scenarios. The vehicle state is the velocity, position, heading, and acceleration of the vehicle 12 (e.g., the host vehicle 10 and/or remote vehicles 54), and the sensed vehicle-state data is the information about the vehicle state of the vehicle 12 sensed by the sensors 40. As discussed above, the sensors 40 may include Global Navigation Satellite System (GNSS) transceivers or receivers, yaw rate sensors, speed sensors, lidars, radars, ultrasonic sensors, and cameras, among others. The sensed vehicle state may be configured as sensed vehicle-state data. Thus, the term "sensed vehicle-state data" means information about the sensed vehicle state of the remote vehicles 54 as collected by the sensors 40. The sensed vehicle-state data may include its association with one or more actuation commands for each driving scenario. In other words, at block 302, the system controller 134 receives the sensed vehicle-state data and the corresponding actuation-command data for multiple driving scenarios. Thus, the system controller 134 knows the sensed vehicle state of the remote vehicles 54 and the corresponding actuation command that was executed when the vehicle 12 was in the sensed vehicle state. In this process 300, the buffered sensed vehicle state versus the actuator command is used as a training dataset. Then, the process 300 proceeds to block 304.

At block 304, the system controller 134 buffers the sensed vehicle-state data and the actuation-command data. To do so, the system controller 134 uses a circular buffer. In the present disclosure, the term "circular buffer" means a data structure that uses a single, fixed-size buffer as if it were connected end-to-end. Then, the process 300 continues to block 306.

At block 306, the system controller 234 determines (e.g., calculates) the error between the buffered sensed vehicle state and the predicted vehicle states (or reference vehicle states). The error then serves as an input to a supervised learning method at block 308. As a non-limiting example, the supervised learning method at block 308 may be stochastic gradient descent learning method. As a result, the supervised learning method outputs one or more tuning parameters or updated weights. Then, the method 300 continues to block 310.

At block 310, the system controller 134 receives the tuning parameters or updated weights. The tuning parameters or updated weights serve as inputs for the forward dynamics predictor. However, the tuning parameters or updated weights are not the only inputs forward dynamics predictor at block 310. The process 300 may entail executing a control policy for the host vehicle 10 at block 312. Upon executing of the control policy, the vehicle controller 34 and/or the system controller 134 outputs one or more actuation commands, which may be configured as actuation-command data at block 314. The system controller 134 then receives the actuation-command data at block 310. Further, the process 300 includes block 316.

At block 316, the system controller 134 determines (e.g., estimates) the road surface condition using, among other things, the sensor data from the remote vehicles 54 for each driving scenario. For example, the system controller 134 may use images captured by cameras to determine the road surface condition. In the present disclosure, the term "road surface condition" means a condition of the surface 66 of the road 68 (FIG. 1) where the vehicle 12 (e.g., the host vehicle 10 and/or remote vehicles 54) is located (e.g., moving or stationary). As a non-limiting example, the road surface condition may include the coefficient of friction between the tires (e.g., the front tires 50 and the rear tires 60) of the vehicle 12 (e.g., the host vehicle 10 and/or remote vehicles 54) and the road surface 66 of the road 68 where the vehicle 12 is driving. The coefficient of friction between the tires of the vehicle 12 (e.g., the host vehicle 10 and/or remote vehicles 54) and the road surface 66 of the road 68 where the vehicle 12 is driving may be configured as surface-coefficient data. Thus, the term "surface-coefficient data" means information about the road surface condition of the road 68 where the remote vehicles 54 are driving in different driving scenarios and includes the coefficient of friction between the tires of the remote vehicles 54 and the surface of the road 68 where the remote vehicles 54 are driving in a plurality of driving scenarios. The system controller 134 may also associate the sensed vehicle state with the road surface condition for each driving scenario.

Returning to block 310, the system controller 134 receives the buffered sensed vehicle-state data, the actuation-command data, and the surface-coefficient data from the remote vehicles 54 as inputs Using the buffered sensed vehicle-state data, the actuation-command data, and the surface-coefficient data from the remote vehicles 54, the system controller 134 predicts a plurality of vehicle states (i.e., the predicted vehicle states) in different driving scenarios. The process 300 then returns to block 306 to determine the error between the predicted vehicle states and the sensed vehicle states. Block 308 and block 310 may collectively be implemented as a self-supervised recurrent neural network (RNN) that predicts the vehicle states of the host vehicle 10 (or another vehicle 12) in different driving scenarios.

Figure 4:
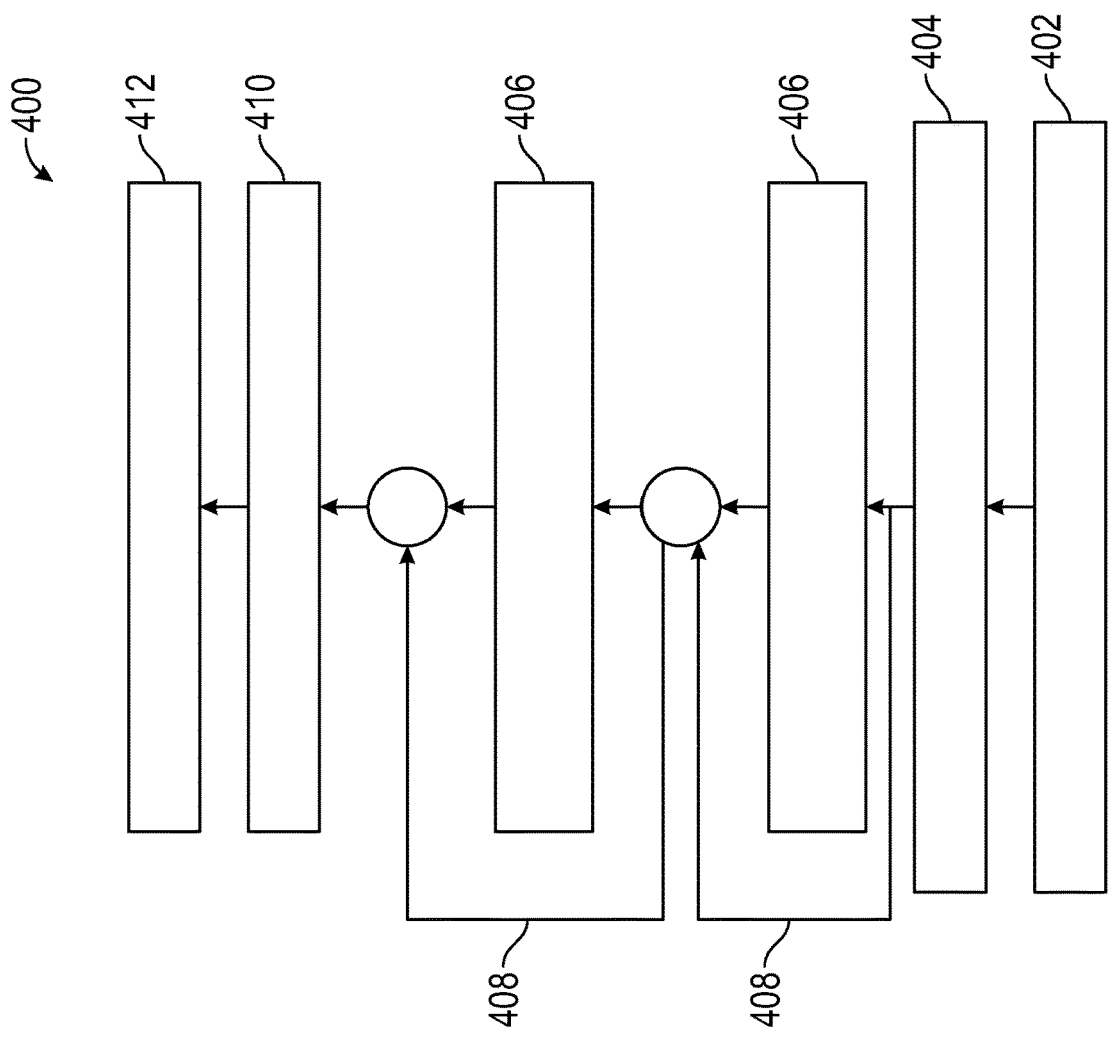
FIG. 4 is a flowchart of a self-supervised RNN for predicting vehicle states.
Figure 6:
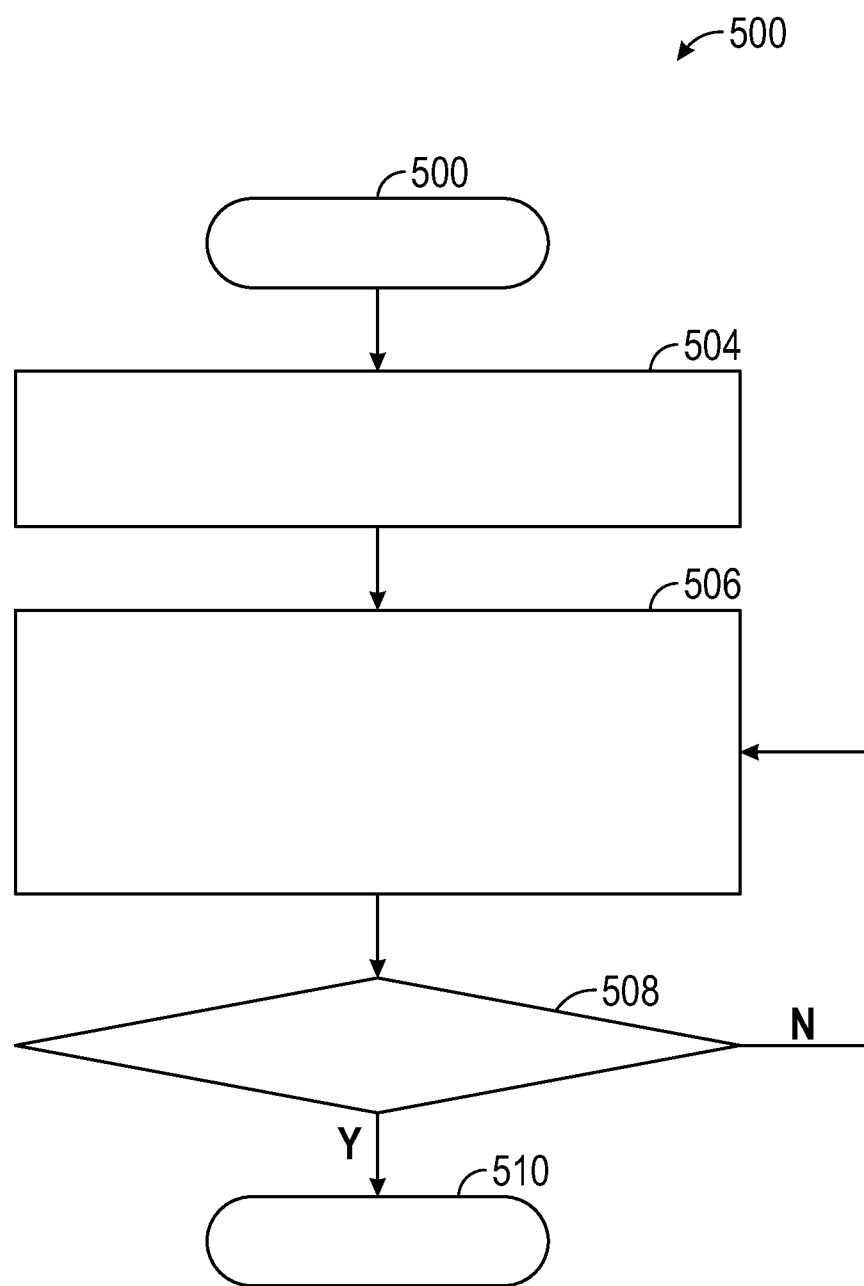
FIG. 6 is a flowchart of a training method for the self-supervised RNN of FIG. 4.

FIG. 4 is a flowchart of a self-supervised RNN 400 for predicting vehicle states. The forward dynamics process 300 is implemented by the self-supervised RNN 400. The self-supervised RNN 400 begins at layer 402. At layer 402, the self-supervised RNN receives the sensed vehicle-state data, the surface-coefficient data, and the actuation-command data collected from numerous remote vehicles 54. Then, the self-supervised RNN 400 continues to layer 404.

At layer 404, the system controller 134 executes a normalization process. In the present disclosure, the term "normalization" means adjusting values measured on different scales to a notionally common scale, thereby allowing the self-supervised RNN 400 to be generalized to any vehicle model. The normalization may be based on vehicle dynamics parameters and geometry specifications, etc. At layer 404, the system controller 134 normalizes, for example, the sensed vehicle-state data, the surface-coefficient data, and the actuation-command data collected from numerous remote vehicles 54. As non-limiting examples, the longitudinal acceleration of the vehicle 12 may be converted to the mass of the vehicle 12 times the longitudinal acceleration of the vehicle 12 and the wheel speed of the vehicle 10 may be converted to the effective rolling radius of the vehicle 12 times the wheel speed of the vehicle 12. Then, the self-supervised RNN 400 continues to a plurality of blocks 406. The number of blocks 406 may vary. Regardless of the number of blocks 406. The self-supervised RNN includes a plurality of blocks 406 linked sequentially with one or more bypass connections 408.

The self-supervised RNN 400 further includes a recurrent layer 410, and the recurrent layer is a last layer of the RNN following the blocks 406. After executing the recurrent layer 410, the self-supervised RNN 400 outputs the predicted vehicle states for different driving scenarios.

Figure 5:
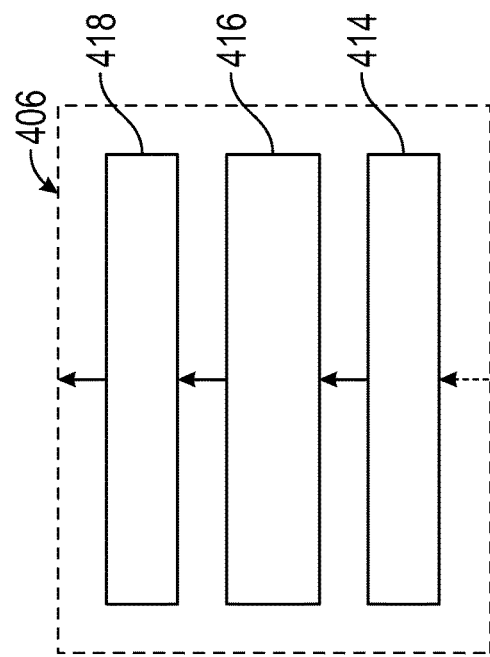
FIG. 5 is a flowchart of a block layer of the self-supervised RNN of FIG. 4.

FIG. 5 is a flowchart of the layer of each block 406. As discussed above, the self-supervised RNN 400 includes blocks 406 linked sequentially with one or more bypass connections 408. Each block 406 begins with a batch normalization layer 414. Further, each block 406 includes one or more fully connected layers 416 following the batch normalization layer 414. The fully connected layer 416 includes a Leaky rectified linear unit (ReLU) activation function. Further, each block 406 includes a dropout layer 418 following the fully connected layer 416.

FIG. 5 is a flowchart of a method 500 for training the self-supervised RNN 400. The method 500 begins at 502. Then, the method 502 proceeds to block 504. At block 506, the system controller 134 uses the buffered sensed vehicle-state data, the actuation-command data, and the surface-coefficient data as the training datasets. Also, the system controller 134 initializes the self-supervised RNN 400 with random small weights. Then, the method 500 continues to block 506.

At block 506, the system controller 134 minimizes a prediction error using stochastic gradient learning method to train the dataset. To do so, the prediction error may be calculated using the following equation:

$$e = \Sigma_{k=t-T-1}^{t} \gamma^{k-t+T-1} \|s(k) - \tilde{s}(k)\| \qquad \text{Eq. 1}$$

where:
e is the prediction error;
$\gamma$ is a discounting factor, wherein $0 < \gamma < 1$;
$\|\cdot\|$ is Huber loss for handling outliers;
k is a driving scenario;
t is an upper limit of the summation;
T is a predetermined number;
s(k) is a vehicle state of the host vehicle 10; and
$\tilde{s}(k)$ is a predicted vehicle state of the host vehicle 10 for driving scenario k.

After block 506, the method 500 proceeds to block 508. At block 508, the system controller 134 determines whether the self-supervised RNN 400 has converged. The self-supervised RNN 400 has converged if either the prediction error is equal or less than the predetermined threshold or the method 200 has undergone more than a predetermined number of iterations. If the self-supervised RNN 400 has not converged, then the method 500 returns to block 506. However, if the self-supervised RNN 400 has converged, then the method 500 proceeds to block 510. At block 510, the method 500 ends.

Figure 7:
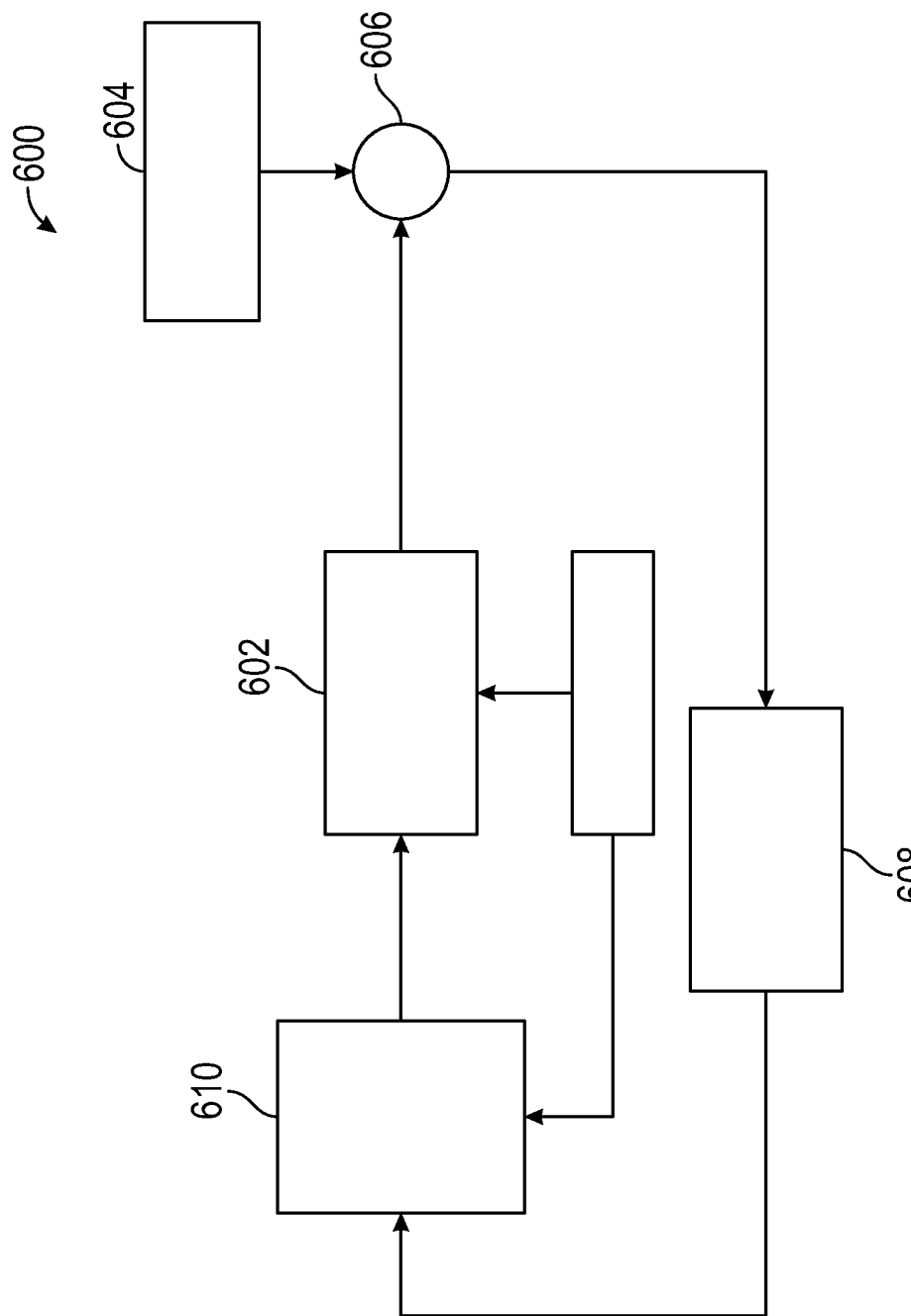
FIG. 7 is a flowchart of an inverse dynamics process to establish a control policy for a host vehicle.

FIG. 7 is a flowchart of an inverse dynamics process 600 to determine actuator commands for the host vehicle 10 (or another vehicle 12) using the predicted vehicle states. The process 600 may be emulated in a cloud-based system and does not necessarily run in the host vehicle 10. The process 600 begins at block 602. At block 602, the system controller 134 executes the forward dynamics process to predict vehicle states (i.e., the predicted vehicle states) in different driving scenarios. The process 600 also includes block 601. At block 601, the system controller 134 retrieves surface-coefficient data, which includes the coefficient of friction between the road surface 66 and the front tires 50 and the rear tires 60. At block 602, the forward dynamics process uses the surface-coefficient data to predict the vehicle state in different driving scenarios. Then, the process 600 continues to block 604. At block 604, the system controller 134 receives the reference vehicle states for different driving scenarios. Next, the process 600 continues to block 606. At block 606, the system controller 134 uses the predicted vehicle states and the reference vehicle states to determine one or more errors in key performance indicators relating to vehicle control performance. As a non-limiting example, one of the key performance indicators may be a yaw rate tracking error with respect to the desired yaw rate. Then, the process 600 continues to block 608. At block 608, the system controller 134 executes a policy-gradient based reinforcement learning method to learn the inverse dynamics of the vehicle (e.g., the host vehicle 10). The policy-gradient based reinforcement learning method uses replay buffer data (e.g., actuation-command data sensed vehicle state data) to store trajectories of experience for offline training and output tuning parameters or updated weights. The process 600 then proceeds to block 610. At block 610, the system controller 134 executes the inverse dynamics process (i.e., the control policy process) to determine the optimal control of the host vehicle 10 using the tuning parameters and the surface-coefficient data. To do so, the system controller 134 may calculate a weighted sum of the energy consumption of the host vehicle 10, the comfort/smoothness of the host vehicle 10 and the error from the reference trajectory. The process 600 is a self-supervised neural network that uses the forward dynamics to train the inverse dynamics process (i.e., the control policy process).

Figure 8:
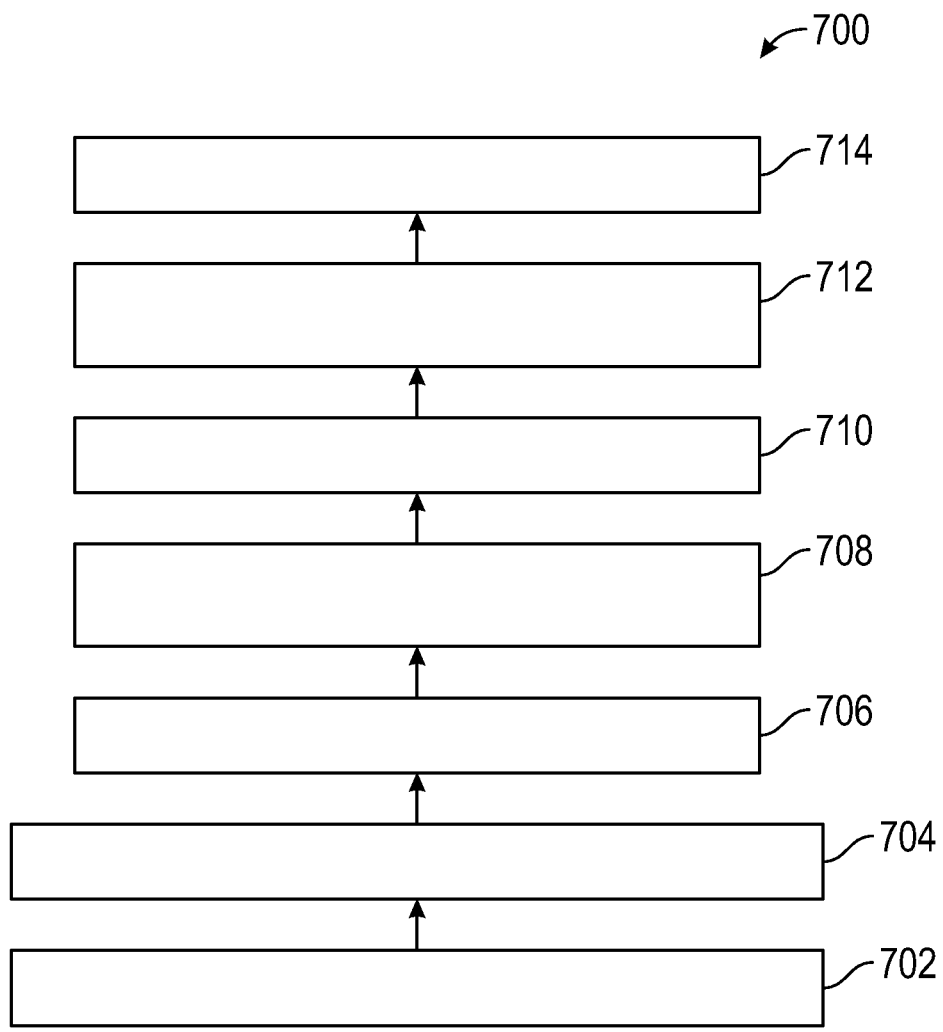
FIG. 8 is a flowchart of a neural network for determining actuator commands for different driving scenarios.

FIG. 8 is a flowchart of a neural network 700 for determining actuator commands for different driving scenarios. The inverse dynamics process 600 is implemented by the neural network 700. The neural network 700 begins at input layer 702. At input layer 702, the neural network 700 receives the reference trajectory data (i.e., reference trajectory for different driving scenarios), the surface-coefficient data, and the predicted vehicle states determined by forward dynamics process 300. The predicted vehicle states may be configured as predicted vehicle-state data. Then, the neural network 700 continues to a normalization layer 704.

At normalization layer 704, the system controller 134 executes a normalization process. In the present disclosure, the term "normalization" means adjusting values measured on different scales to a notionally common scale. At normalization layer 704704, the system controller 134 normalizes the reference trajectory data, the surface-coefficient data, and the predicted vehicle-state data. As non-limiting examples, the system controller 134 may execute a zero-mean normalization. Then, the neural network 700 continues to a batch normalization layer 706. The neural network 700 further includes a first fully connected layer 708 following the batch normalization layer 706. The first fully connected layer 708 includes a Leaky rectified linear unit (ReLU) activation function. Further, the neural network 700 includes a dropout layer 710 following the first fully connected layer 708. The neural network 700 includes a second fully connected layer 712. The second fully connected layer 712 includes a Leaky rectified linear unit (ReLU) activation function. Then, the neural network 700 outputs the actuator commands for different driving scenarios at the actuator command layer 714.

Figure 9:
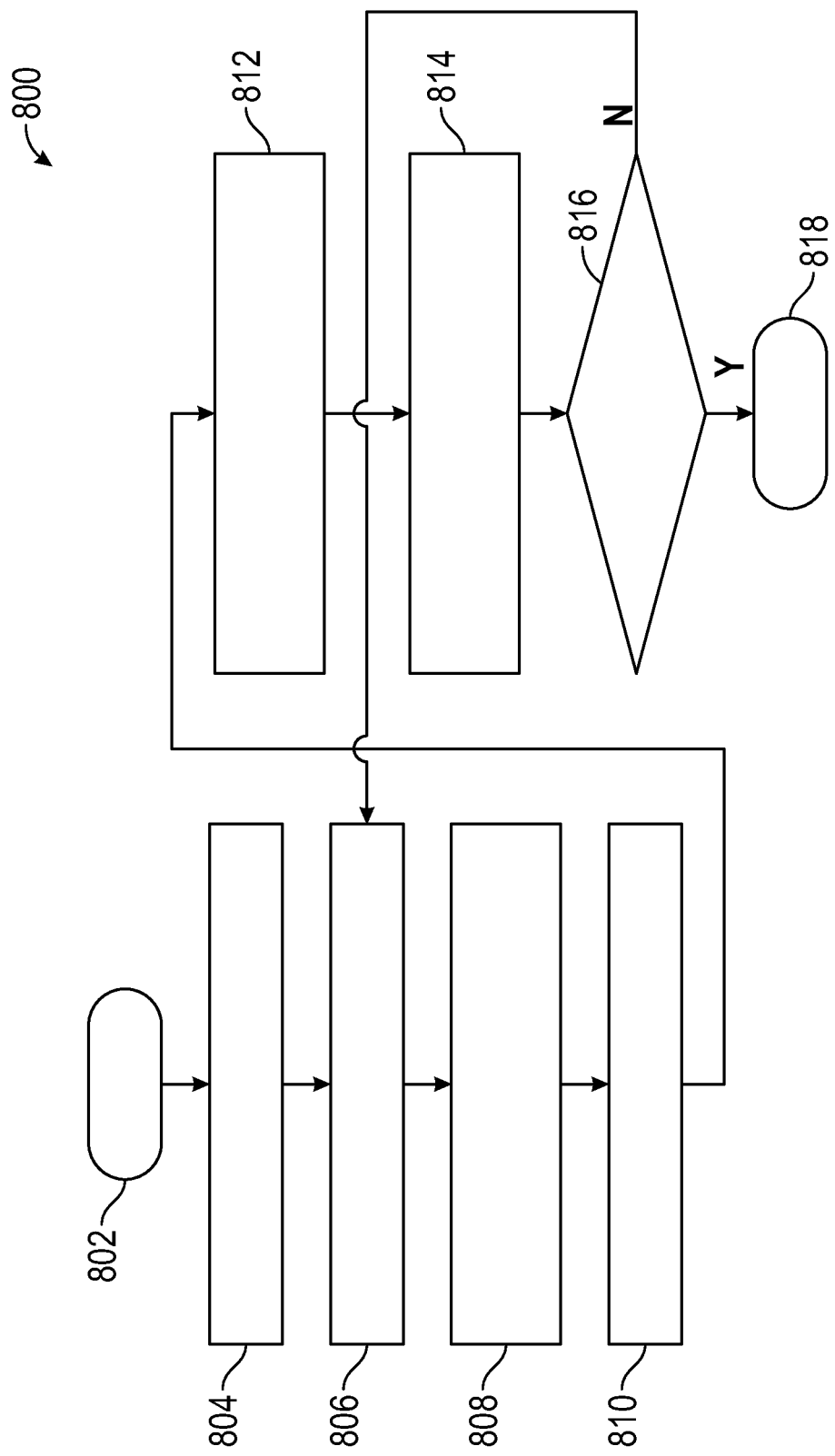
FIG. 9 is a flowchart of a method 800 for training the neural network.

FIG. 9 is a flowchart of a method 800 for training the neural network. The method 800 begins at block 802. Then, the method 800 proceeds to block 804. At block 804, the system controller 134 identifies each reference trajectory (i.e., each reference scenario). The method 800 is performed for each reference scenario. Then, the method 800 continues to block 806. At block 806, the system controller 134 randomly selects an initial vehicle state. The method 800 then proceeds to block 808. At block 808, the system controller 134 runs the control policy (i.e., the neural network 700). Then, the method 800 continues to block 810. At block 810, the system controller 134 receives the predicted vehicle states for different driving scenarios. Then, the method 800 continues to block 812. At block 812, the system controller 134 compares the reference trajectory with the predicted trajectory determined by the predicted vehicle state. Further, at block 812, the system controller 134 computes the error between the reference trajectory and the predicted trajectory. Then, the method 800 continues to block 814. At block 814, the system controller 134 tunes the weights based on the error between the reference trajectory and the predicted trajectory. Then, the method 800 continues to block 816. At block 816, the system controller 134 determines if the last driving scenario has been analyzed by the method 800. If more driving scenarios need be analyzed by the method 800, then the method 800 returns to block 806. If the last driving scenario has been analyzed by the method 800, the method 800 proceeds to block 818. At block 818, the method 800 ends.

Figure 10:
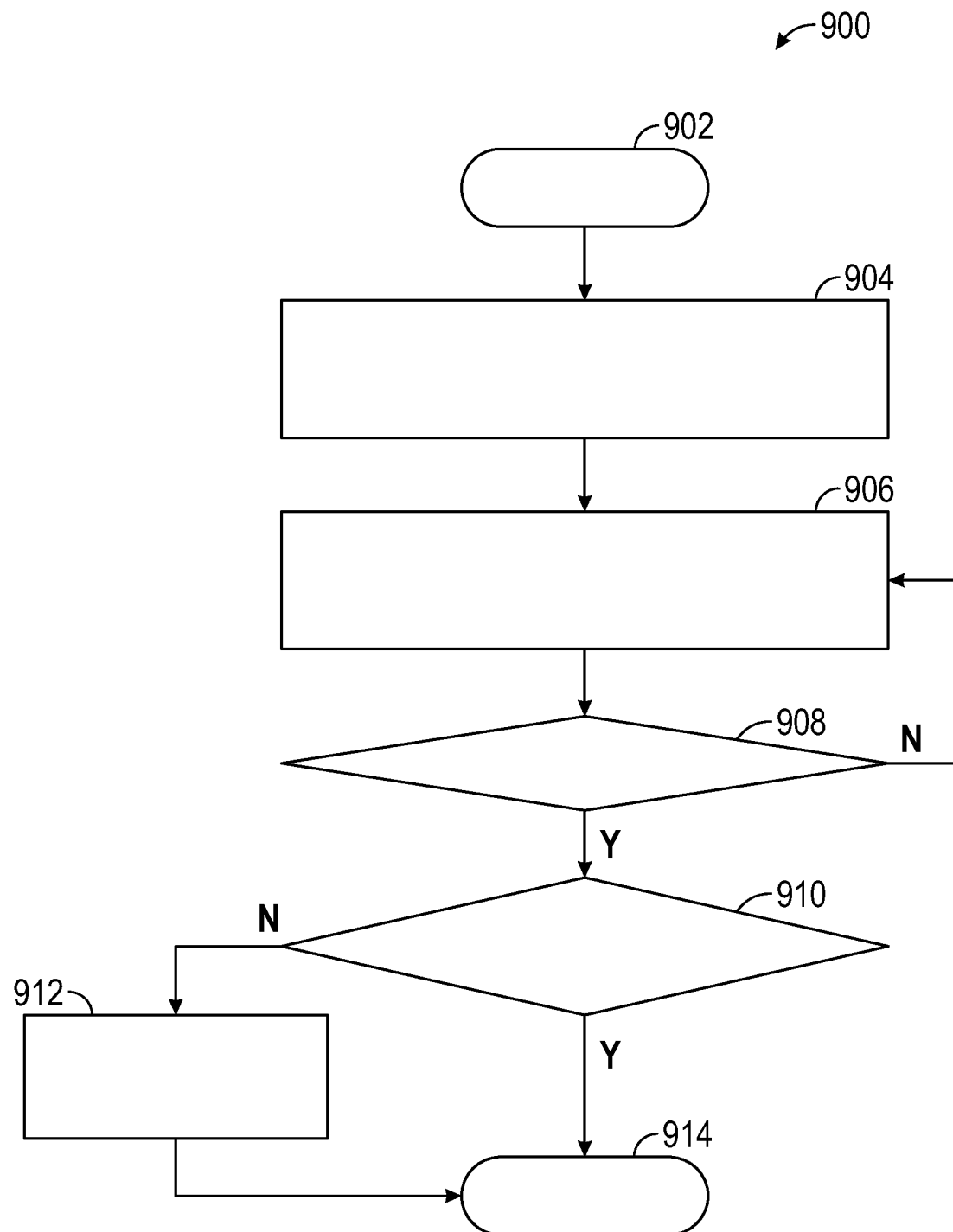
FIG. 10 is a flowchart of an online real-time adaptation process.

FIG. 10 is a flowchart of an online real-time adaptation process 900. The process 900 begins at block 902. Then, the process 900 proceeds to block 904. At block 904, the system controller 134 determines (e.g., estimates) the environmental changes such as road conditions. As a non-limiting example, the sensors 40 (e.g., cameras) may be used to determine the road conditions. Other environment changes, such as a replaced tire and/or weight distribution changes) may be determined using consumer database or on-board estimation functions. Then, the process 900 continues to block 906. At block 906, the neural network 400 and/or the neural network 700 train (i.e., retune) the weights of the neural network 400 and/or the neural network 700. Then, the process 900 continues to block 908. At block 908, the system controller 134 determines whether the neural network 400 and/or the neural network 700 have converged. If the neural network 400 and/or the neural network 700 have not converged, then the process 900 returns to block 906. If the neural network 400 and/or the neural network 700 have converged, then the process 900 continues to block 910. At block 910, the system controller 134 determines whether the predicted vehicle state is within a safe envelope. If the predicted vehicle state is not within the safe envelope, then the process 900 proceeds to block 912. At block 912, the system controller 134 uses a model-based approach to control the movements of the host vehicle 10. If the predicted vehicle state is within the safe envelope, then the process 900 uses the predicted vehicle state to control the movements of the host vehicle 10. Then, the process 900 continues to block 914. At block 914, the process 900 ends.

Figure 11:
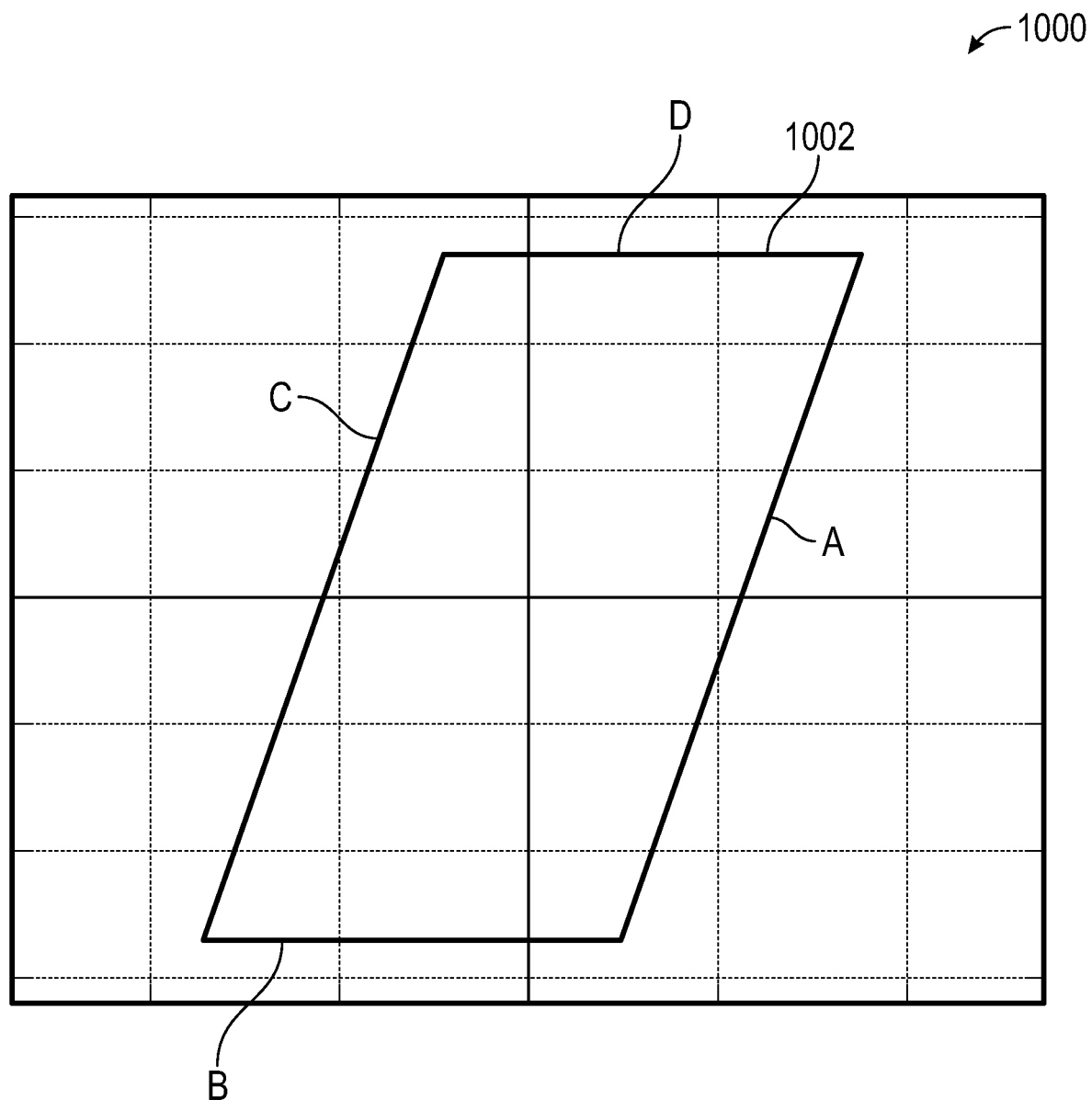
FIG. 11 is a safe envelope diagram.

FIG. 11 is a safe envelope diagram 1000 for determining stable handle as discussed above with respect to block 910 (FIG. 10). The diagram 1000 has a horizontal axis $\beta$ that represents sideslip and a vertical axis $\gamma$ that represents yaw rate. The diagram 1000 shows a stable handling envelope 1002 enclosed by a first bound A, a second bound B, a third bound C, and a fourth bound D. The stable handling envelope 1002 represents a safe region of the sideslip $\beta$ and yaw rate $\gamma$. For every vehicle state in the handling envelope 1002, there is an input to maintain the vehicle state within the stable handling envelope 1002. The first bound A and the third bound C of the stable handling envelope 1002 may be determined using the following equation:

$$|\beta_{ss}| = \alpha_{sat} + \frac{l_r}{V_x}\gamma \qquad \text{Eq. 2}$$

where:
$\alpha_{sat}$ is a rear slip angle of the vehicle 12 that generates the maximum lateral force;
$V_x$ is the longitudinal axis of the vehicle 12;
$\gamma$ is the yaw rate of the vehicle 12;
$l_r$ is the distance from the center of mass 61 (FIG. 1) to the rear axle 62 (FIG. 2) of the vehicle 12; and
$\beta_{ss}$ is the sideslip within stable handling envelope 1002.

The second B and fourth bounds D of the stable handling envelope 1002 may be determined using the following equation:

$$|r_{ss}| = \frac{\mu g}{V_x} \qquad \text{Eq. 3}$$

where:
- μ is an estimated coefficient of friction between the road surface 66 and the front tires 50 and the rear tires 60 of the vehicle 12;
- $V_x$ is the longitudinal axis of the vehicle 12;
- g is the gravitational constant; and
- γ is the yaw rate within stable handling envelope 1002.

As discussed above with respect to FIG. 10, the system controller 134 uses a model-based approach to control the movements of the host vehicle 10 if the predicted vehicle state is not within a safe envelope to enhance vehicle safety and performance consistency. As a non-limiting example, the model-based approach may include a prediction model, an optimizer, and a vehicle state estimator.

Figure 12:
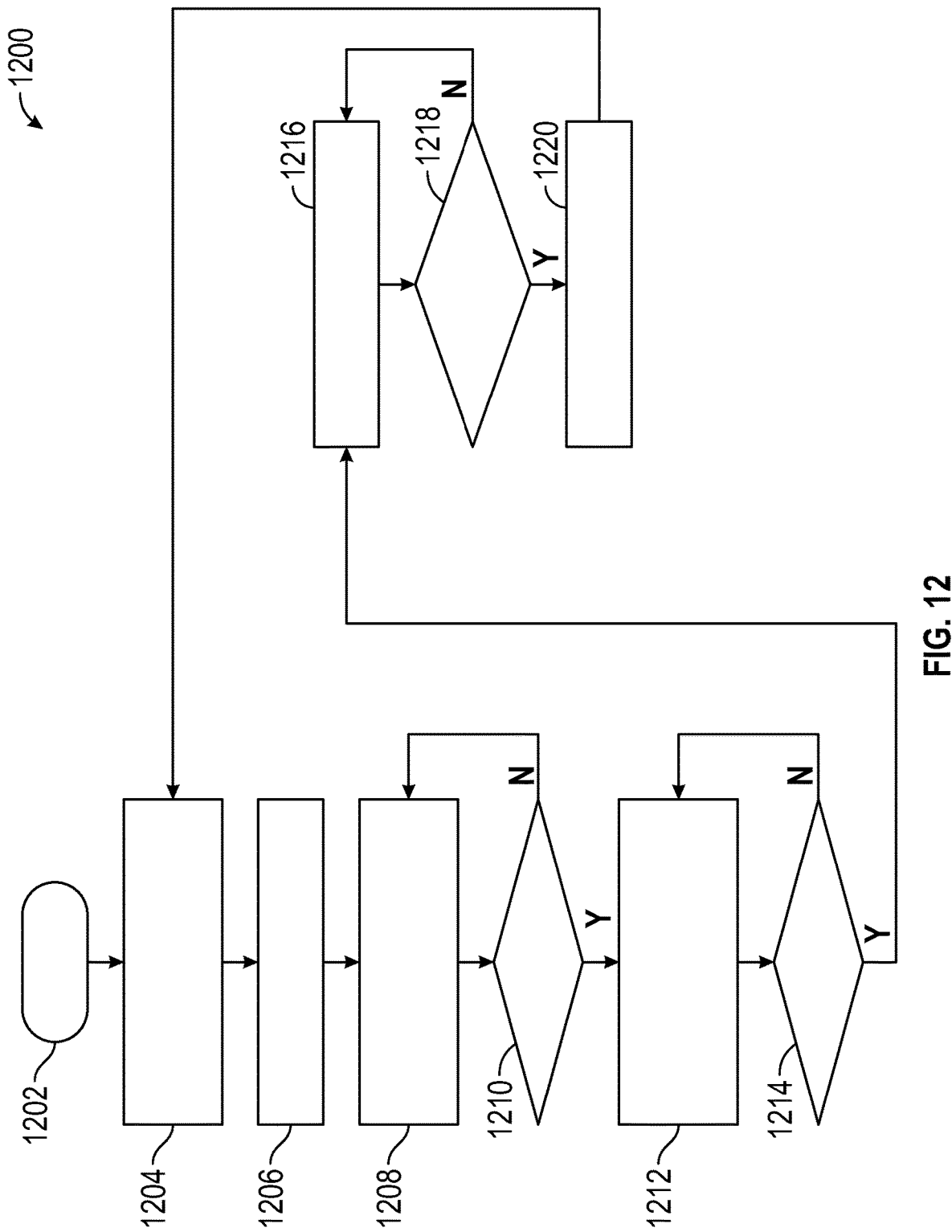
FIG. 12 is a flowchart of a training and deployment iteration method.

FIG. 12 is a flowchart of a training and deployment iteration method 1200. The method 1200 beings at block 1202. Then, the method 1200 continues to block 1204. At block 1204, vehicle fleet data is captured. That is, at block 1204, the sensed vehicle-state data along with the associated actuation-command data is captured by, for example, the sensors 40 of the remote vehicles 54. The system controller 134 then receives the sensed vehicle-state data along with the associated actuation-command data. Next, the method 1200 continues to block 1206. At block 1206, the vehicle fleet data (i.e., the sensed vehicle-state data along with the associated actuation-command data) is normalized as discussed above. Then, the method 1200 proceeds to block 1208. At block 1208, the self-supervised RNN 400 of the forward dynamics process 300 is trained as discussed above. Then, the method 1200 continues to block 1210. At block 1210, the system controller 134 determines whether the self-supervised RNN 400 has converged. If the self-supervised RNN 400 has not converged, then the method 1200 returns to block 1208. If the self-supervised RNN 400 has converged, then the method 1200 continues to block 1212. At block 1212, the neural network 700 of the inverse dynamics process 600 is trained using a policy gradient method. The method 1200 then proceeds to block 1214. At block 1214, the system controller 134 determines whether the neural network 700 has converged. If the neural network 700 has not converged, then the method 1200 returns to block 1212. If the neural network 700 has converged, then the method 1200 continues to block 1216. At block 1216, the outputs of the neural network 700 are validated in the host vehicle 10. The method 1200 then continues to block 1218. At block 1218, the vehicle controller 34 of the host vehicle 10 determines whether the outputs of the neural network 700 have been validated. If the outputs of the neural network 700 are not validated, then the method 1200 returns to block 1216. If the outputs of the neural network 700 are validated, then the method 1200 deploys the self-supervised RNN 400 of the forward dynamics process 300 and the neural network 700 of the inverse dynamics process 600 to a fleet of vehicles 12 (i.e., the host vehicle 10 and the remove vehicles 54). Then, the method 1200 continues to block 1220. At block 1220, the vehicle controller 34 commands the host vehicle 10 to move autonomously in accordance with a trajectory determined using the vehicle states predicted using the self-supervised RNN 400 and the actuator commands determined using the neural network 700.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for vehicle motion control, comprising:
   receiving sensed vehicle-state data, actuation-command data, and surface-coefficient data from a plurality of remote vehicles;
   inputting the sensed vehicle-state data, the actuation-command data, and the surface-coefficient data into a self-supervised recurrent neural network (RNN) to predict vehicle states of a host vehicle in a plurality of driving scenarios; and
   commanding the host vehicle to move autonomously in accordance with a trajectory determined using the vehicle states predicted using the self-supervised RNN.

2. The method of claim 1, further comprising training the self-supervised RNN, wherein training the self-supervised RNN includes receiving training data sets, the training data sets include the sensed vehicle-state data and the actuation-command data, and the sensed vehicle-state data is buffered.

3. The method of claim 2, wherein the self-supervised RNN uses stochastic gradient descent learning to predict the vehicle states of the host vehicle in the plurality of driving scenarios.

4. The method of claim 3, wherein the self-supervised RNN includes a plurality of blocks linked sequentially with a bypass connection, and the self-supervised RNN further includes a recurrent layer, and the recurrent layer is a last layer of the RNN.

5. The method of claim 4, wherein each of the plurality of blocks includes a batch normalization layer and a fully connected layer following the batch normalization layer.

6. The method of claim 5, wherein the fully connected layer include a Leaky rectified linear unit (ReLU) activation function.

7. The method of claim 6, wherein each of the plurality of blocks includes a dropout layer following the fully connected layers.

8. The method of claim 7, wherein training the self-supervised RNN includes:
   initializing the self-supervised RNN with a plurality of random weights, each of the plurality of the random weights has a weight value, and the weight value is less than a predetermined value.

9. The method of claim 8, wherein training the self-supervised RNN includes minimizing a prediction error.

10. The method of claim 9, wherein the prediction error is calculated using a following equation:

$$e = \sum_{k=t-T+1}^{t} \gamma^{k-t+T-1} \|s(k) - \tilde{s}(k)\|$$

where:
e is the prediction error;
$\gamma$ is a discounting factor, wherein $0<\gamma<1$;
$\|\cdot\|$ is Huber loss for handling outliers;
k is an index of summation;
t is an upper limit of the summation;
T is a predetermined number;
s(k) is a vehicle state of the host vehicle; and
$\tilde{s}(k)$ is a predicted vehicle state of the host vehicle.

11. A tangible, non-transitory, machine-readable medium, comprising machine-readable instructions, that when executed by a processor, cause the processor to:
   receive sensed vehicle-state data, actuation-command data, and surface-coefficient data from a plurality of remote vehicles;
   input the sensed vehicle-state data, the actuation-command data, and the surface-coefficient data into a self-supervised recurrent neural network (RNN) to predict vehicle states of a host vehicle in a plurality of driving scenarios; and
   commanding the host vehicle to move autonomously in accordance with a trajectory determined using the vehicle states predicted using the self-supervised RNN.

12. The tangible, non-transitory, machine-readable medium of claim 11, wherein the tangible, non-transitory, machine-readable medium, further comprising machine-readable instructions, that when executed by the processor, causes the processor to:
   train the self-supervised RNN, wherein training the self-supervised RNN includes receiving training data sets, the training data sets include the sensed vehicle-state data and the actuation-command data, and the vehicle-state data is buffered.

13. The tangible, non-transitory, machine-readable medium of claim 12, wherein the tangible, non-transitory, machine-readable medium, further comprising machine-readable instructions, that when executed by the processor, causes the processor to:
   use stochastic gradient descent learning to predict the vehicle chassis dynamics of the host vehicle.

14. The tangible, non-transitory, machine-readable medium of claim 13, wherein self-supervised RNN includes a plurality of blocks linked sequentially with a bypass connection, and the self-supervised RNN further includes a recurrent layer, and the recurrent layer is a last layer of the RNN.

15. The tangible, non-transitory, machine-readable medium of claim 14, wherein each of the plurality of blocks includes a batch normalization layer and a fully-connected layer following the batch normalization layer.

16. The tangible, non-transitory, machine-readable medium of claim 15, wherein the fully connected layer includes a Leaky rectified linear unit (ReLU) activation function.

17. The tangible, non-transitory, machine-readable medium of claim 16, wherein each of the plurality of blocks includes a dropout layer following the fully connected layer.

18. The tangible, non-transitory, machine-readable medium of claim 17, wherein training the self-supervised RNN includes initializing the self-supervised RNN with a plurality of random weights, each of the plurality of the random weights has a weight value, and the weight value is less than a predetermined value.

19. The tangible, non-transitory, machine-readable medium of claim 18, wherein training the self-supervised RNN includes minimizing a prediction error.

20. The tangible, non-transitory, machine-readable medium of claim 18, wherein a prediction error is calculated using a following equation:

$$e = \sum_{k=t-T+1}^{t} \gamma^{k-t+T-1} \|s(k) - \tilde{s}(k)\|$$

where:
γ is a discounting factor, wherein 0<γ<1;
∥·∥ is Huber loss for handling outliers;
k is an index of summation;
t is an upper limit of the summation;
T is a predetermined number;
s(k) is a vehicle state of the host vehicle; and
$\tilde{s}(k)$ is a predicted vehicle state of the host vehicle.

* * * * *